United States Patent [19]

McFadden, Jr.

[11] 4,031,749
[45] June 28, 1977

[54] PROBE SYSTEM FOR WIND TUNNEL TEST SECTION

[75] Inventor: Buryl L. McFadden, Jr., Green County, Ohio

[73] Assignee: The United States of America as represented by the Secretary of the Air Force, Washington, D.C.

[22] Filed: June 15, 1976

[21] Appl. No.: 696,342

[52] U.S. Cl. .................................. 73/147
[51] Int. Cl.² ............................. G01M 9/00
[58] Field of Search ................. 73/147, 432 SD

[56] References Cited
UNITED STATES PATENTS

| | | | |
|---|---|---|---|
| 3,027,760 | 4/1962 | Holderer | 73/147 |
| 3,583,815 | 6/1971 | Kersey, Jr. | 73/147 X |
| 3,602,920 | 9/1971 | Davis et al. | 73/147 |

Primary Examiner—Richard C. Queisser
Assistant Examiner—Joseph W. Roskos
Attorney, Agent, or Firm—Joseph E. Rusz; Richard J. Killoren

[57] ABSTRACT

A wind tunnel test section having an outer shell member and an inner liner member within the shell member. Bearings are provided between the inner liner and shell member to permit rotation of the inner liner within the shell member. Holes are provided in the inner liner to permit the insertion of probes into the test section. Probe retainer plugs hold the probes in the holes. The probe retainer plugs are replaced by blind plugs for sealing the holes when the probes are removed. Elongated slots are provided in the outer shell so that the probes can be located in different positions in the test section. A drive mechanism is provided for rotating the inner liner within the outer shell.

3 Claims, 7 Drawing Figures

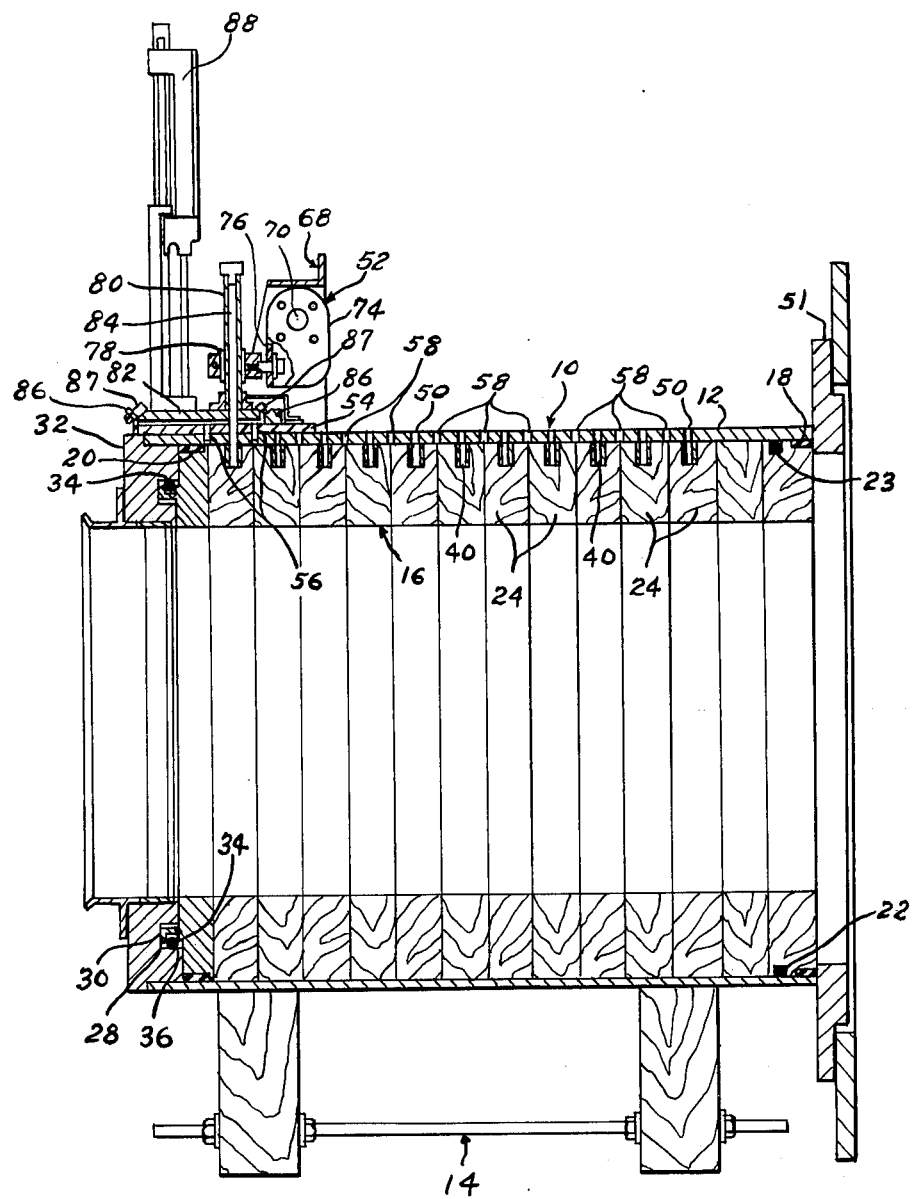

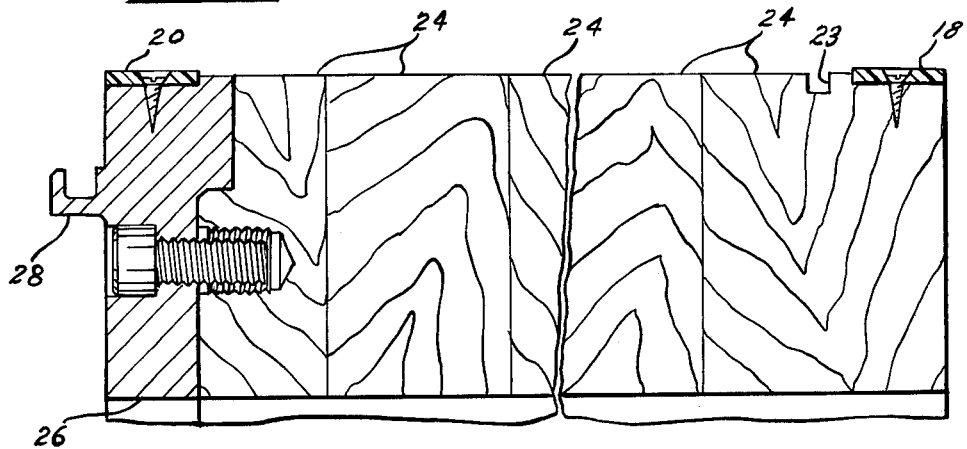
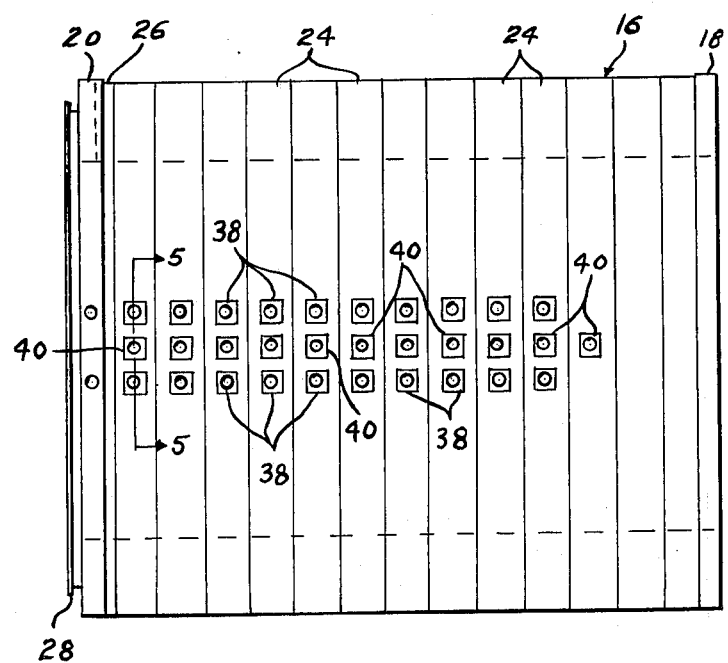

PROBE SYSTEM FOR WIND TUNNEL TEST SECTION

RIGHTS OF THE GOVERNMENT

The invention described herein may be manufactured and used by or for the Government of the United States for all governmental purposes without the payment of any royalty.

BACKGROUND OF THE INVENTION

In conventional test sections for wind tunnels, it is sometimes desirable to obtain test data at various positions around the test device. It is necessary to provide apparatus to obtain the test data which will not cause undesirable flow disturbances within the test section.

In one prior art test system, the test device is mounted upon a movable support. This requires a complex configuration to provide apparatus which will permit movement of the test apparatus without causing undesirable flow disturbances within the test section.

It has been suggested that slots with movable closure elements be provided to permit movement of probes within a test section. It is difficult to provide a movable closure element that will not cause undesirable flow disturbances in the test section.

BRIEF SUMMARY OF THE INVENTION

According to this invention, a wind tunnel test section is provided wherein a cylindrical inner liner member is located within a cylindrical outer shell member. Bearing members are provided between the inner liner and outer shell at the two ends of the test section. Apparatus is provided to rotate the inner liner within the outer shell. Probe holders are located in holes in the inner liner members. Slots are provided in the outer shell to accommodate the probes as the inner liner is rotated within the outer shell.

IN THE DRAWINGS

FIG. 2 is a partially schematic sectional view of the device of FIG. 1 taken along the line 2—2.

FIG. 3 is a broken enlarged cross sectional view of the inner liner for the device of FIGS. 1 and 2.

FIG. 4 is a top view of the inner liner for the device of FIGS. 1 and 2.

DETAILED DESCRIPTION OF THE INVENTION

Figure 1:
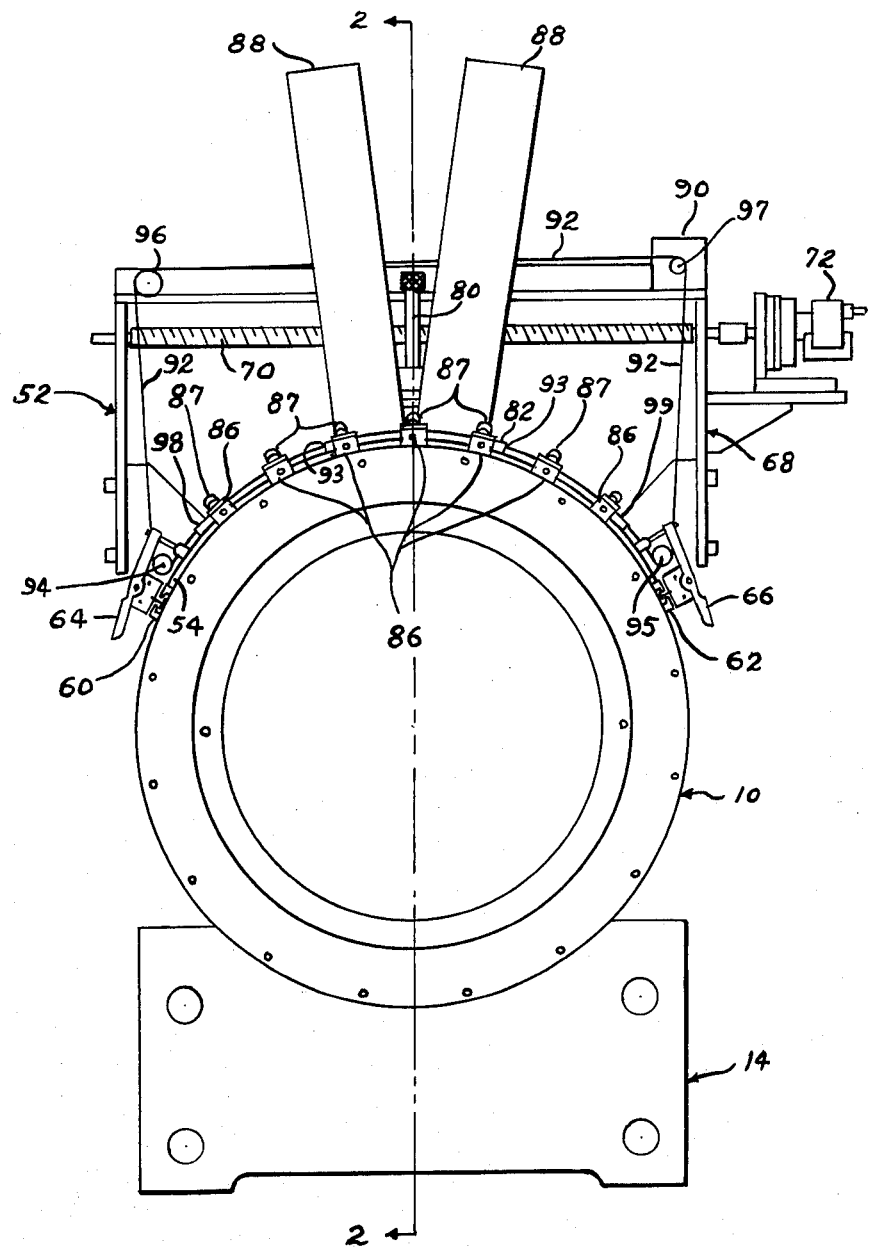
FIG. 1 is a partially schematic end view of the wind tunnel test section of the invention.

Reference is now made to FIGS. 1 and 2 of the drawing which show a wind tunnel 10 having a cylindrical outer shell member 12 mounted on supports 14. A cylindrical inner liner member 16 is supported on bearings 18 and 20 within the outer shell member 12. The bearings 18 and 20 are preferably made of Teflon. An O-ring seal 22 is provided in slot 23 adjacent the bearing 18.

The liner member 16 is made of wood laminates 24 as shown in FIG. 3. A seal support end plate 26 is secured to one end of the inner liner. A seal holder ring 28 on end plate 26 projects into a circular slot 30 in a sealing ring 32. An O-ring 34 fits into ring holder 28 and engages surface 36 to provide a seal. The O-rings 22 and 34 are made from conventional polyflow tubing.

Figure 5:
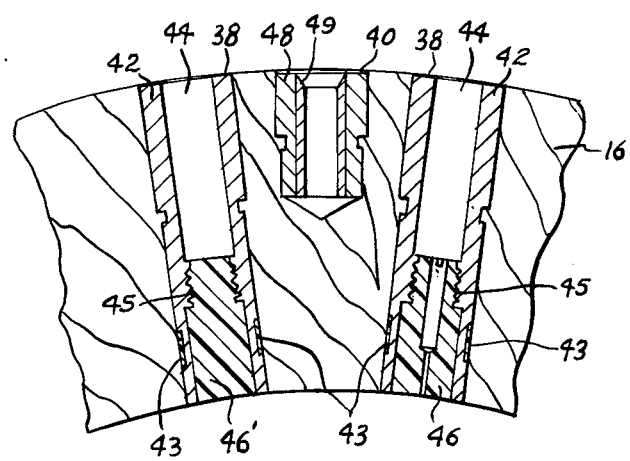
FIG. 5 is a cross sectional view taken along the line 5—5 of FIG. 4.
Figure 6:
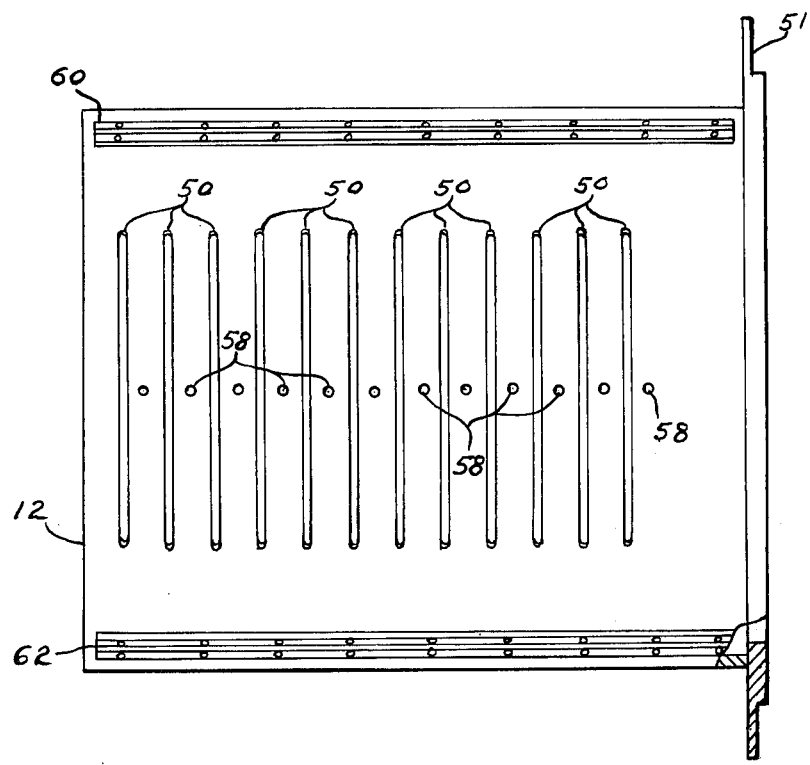
FIG. 6 is a top view of the outer shell member for the device of FIGS. 1 and 2.

The inner liner 16 has a plurality of square holes 38 extending through the wall and a plurality of square holes 40 extending partially through the wall, as shown in FIGS. 4 and 5. The holes 38 have aluminum inserts 42 secured therein with an epoxy cement 43. A center hole 44 in insert 42 is cylindrically shaped and has a threaded portion 45 for receiving the probe retainer plug 46. Blind plugs 46' are threaded into the holes 44 that are not being used for probes.

Holes 40 have square aluminum inserts 48 with cylindrical stainless steel liners 49 which are inserted in the inserts 48 with a press fit. The inserts 48 and liners 49 form driving hard points for the inner liner 16.

The outer shell 12 has a plurality of elongated circumferential slots 50 which register with holes 38 and 40 in the inner liner member 16 so that rotation of the inner liner within the outer shell will cause the probes to move in slots 50. A wind tunnel mounting flange 51 is welded to one end of the outer shell 12 and acts as an abutment for the inner liner. Trackways 60 and 62, for hold down clamps, are secured to the outer surface of outer shell 12.

A drive mechanism 52 is mounted on the outer shell 12. The drive mechanism has a support member 54 which substantially conforms to the other surface of outer shell member 12. The support member 54 has a pair of pins 56 which engage holes 58, in the outer shell 12, to position the drive mechanism on the outer shell 12. Over-center clamps 64 and 66 are secured in trackways 60 and 62 on the outer shell 12 and are movable in the trackways to the position of the support member 54 and act to retain the support member.

The support member 54 forms part of a support frame 68. A screw drive 70 is held by the support frame 68 and is driven by a motor 72.

A linear screw follower 74 has a bracket 76 secured thereto. A linear bearing 78 is pivotably supported on bracket 76 and has a hollow shaft 80 passing through the bearing. The shaft 80 is secured to a guide member 82 which rides on the support member 54. A drive rod 84 is threaded into the top of shaft 80 and extends into one of the liners 49 in one of the holes 40.

Guide brackets 86 are positioned adjacent the path of the guide member 82 and have rotatable positioning supports 87 for engaging the guide member 82. A pair of probe supports are shown schematically at 88. The position of the probe can be indicated at a remote location by means of a variable potentiometer 90 which is driven by a wire 92 which passes over pulleys 94, 95, 96 and potentiometer drive shaft 97 and which is secured to opposite sides of guide member 82 at 93.

Limit motion stop switches 98 and 99 act to stop the motor in a conventional manner.

In the operation of the device of the invention, the drive mechanism is positioned over one of the elongated slots 50 in the outer shell to permit positioning the probes in the desired longitudinal position within the test section. With pins 56 engaging corresponding holes 58, the over-center clamps 64 and 66 are moved in trackways 60 and 62 to a position to retain the support member 54 in place. The pin 84 is then inserted into the corresponding driving hard point in liner 16. Probes can then be inserted in the desired probe support plug 46. Motor 72 is then started to position the probes in the desired circumferential position within the test section. The probes extending through outer shell 12 move in slots 50. The stop switches act to stop the motor before the probes reach the end of the slots 50.

Figure 7:
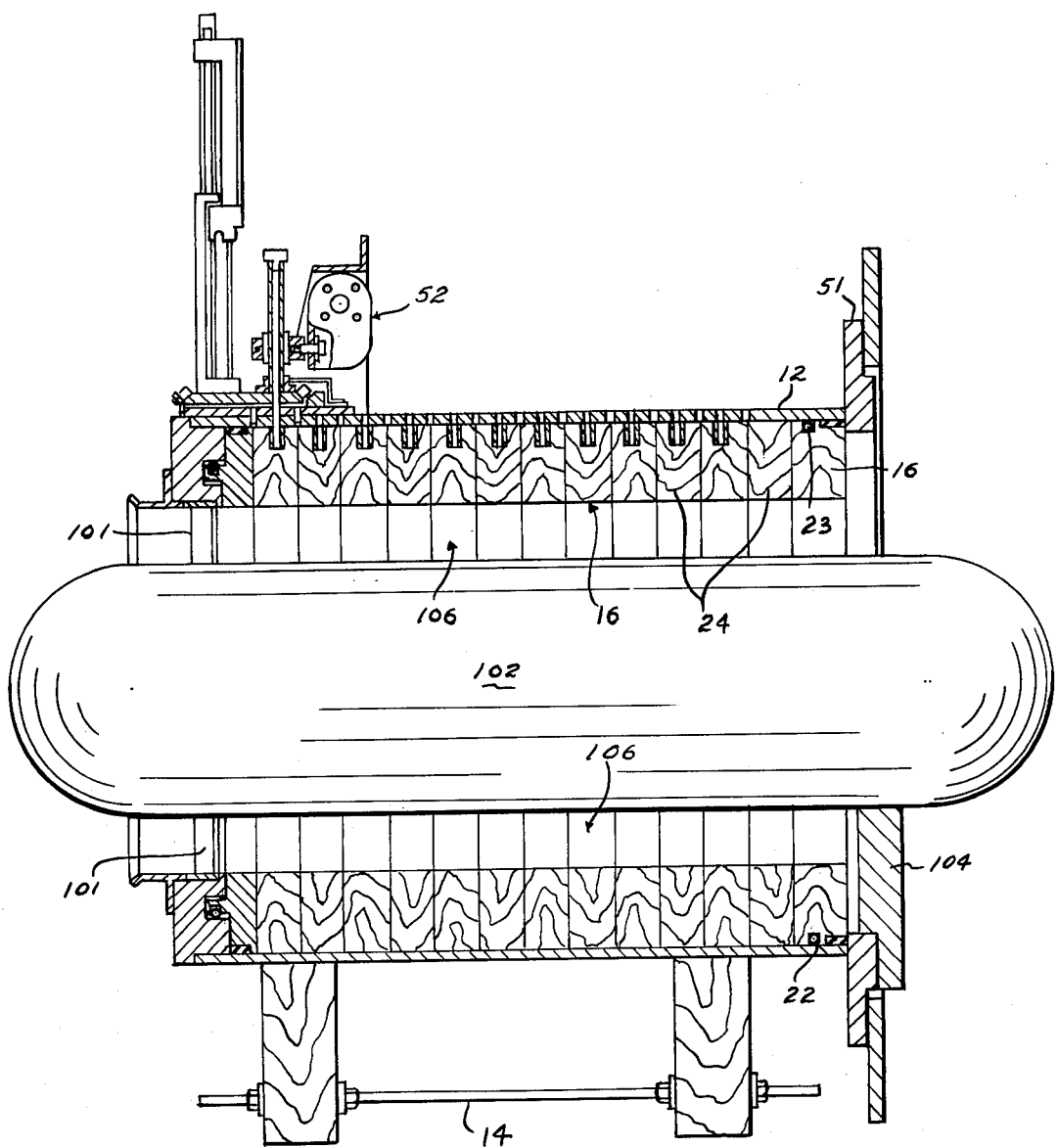
FIG. 7 shows the device of FIG. 2 with a center body and vane section mounted within the test section.

One use of the device of the invention is shown in FIG. 7, wherein a vane system 101 surrounding a center body 102 in positioned within the test section 10. Three supports 104, one of which is shown, support the other end of the center body. The positioning mechanism can then be used to position probes at various positions in the flow channel 106, surrounding the center body 102.

There is thus provided a test section for a wind tunnel which permits movement of the test probes, with respect to a test device, within the test section, which substantially reduces undesirable flow disturbances within the test section.

I claim:

1. A wind tunnel test section, comprising: an outer cylindrical shell member; a cylindrical inner liner positioned within said shell member; a pair of bearing members at opposite ends of said liner member, between the liner member and the outer shell member; a plurality of probe retainer plugs in said liner member, adapted to support a test probe within the test section; a plurality of elongated circumferentially positioned slots in said outer shell member positioned adjacent said probe retainer plugs; means for rotating said inner liner member within said outer shell member, to thereby move said probe retainer plugs along the slots in said outer shell member.

2. The apparatus as recited in claim 1 wherein said means for rotating said inner liner member within said outer shell member, comprises: a drive rod passing through one of said circumferentially positioned slots and attached to said inner liner member; a support frame mounted on said outer shell member; means for positioning said support frame on said outer shell; means, mounted on said support frame for moving said drive rod along said slot to thereby rotate the inner liner within said outer shell.

3. The device as recited in claim 2 wherein said means for moving said drive rod along said slot includes: a screw drive mounted on said support frame; a motor, supported on said support frame, connected to said screw drive; a screw follower on said screw drive; a linear bearing pivotably supported on said screw follower; a hollow shaft slidably supported in said linear bearing; said drive rod being positioned within said hollow shaft.

* * * * *